US008152124B2

(12) United States Patent
Branham

(10) Patent No.: US 8,152,124 B2
(45) Date of Patent: Apr. 10, 2012

(54) ADJUSTABLE SUPPORT ARM FOR A VEHICLE EXTERIOR REARVIEW MIRROR ASSEMBLY

(75) Inventor: Michael Dean Branham, Blythewood, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 955 days.

(21) Appl. No.: 12/150,438

(22) Filed: Apr. 28, 2008

(65) Prior Publication Data

US 2008/0265122 A1 Oct. 30, 2008

Related U.S. Application Data

(60) Provisional application No. 60/926,915, filed on Apr. 30, 2007.

(51) Int. Cl.
| *A47F 1/14* | (2006.01) |
| *A47F 5/00* | (2006.01) |
| *A47G 1/02* | (2006.01) |
| *A47G 1/24* | (2006.01) |
| *B60R 1/02* | (2006.01) |
| *G02B 7/182* | (2006.01) |

(52) U.S. Cl. ............ 248/475.1; 248/476; 248/479; 248/483; 248/495; 248/289.11; 248/474; 359/871; 359/872

(58) Field of Classification Search ............ 248/478, 248/475.1, 476, 479, 482, 477, 224.61, 225.11, 248/483, 484, 495, 289.11, 346.04, 314, 248/408, 474; 359/871, 872
See application file for complete search history.

(56) References Cited

U.S. PATENT DOCUMENTS

| 3,334,853 | A | * | 8/1967 | Noll ................. 248/289.11 |
| 3,672,053 | A | * | 6/1972 | Wiss ...................... 30/267 |
| 3,730,474 | A |   | 5/1973 | Bowers |
| 4,135,694 | A |   | 1/1979 | Stegenga et al. |
| 4,186,905 | A | * | 2/1980 | Brudy .................... 248/478 |
| 4,645,316 | A |   | 2/1987 | Ohyama |
| 4,786,156 | A | * | 11/1988 | Kotani et al. ............ 359/872 |
| 5,073,019 | A |   | 12/1991 | Ferreira do Espirito Santo |
| 5,384,660 | A | * | 1/1995 | Oishi ..................... 359/841 |
| 5,557,476 | A | * | 9/1996 | Oishi ..................... 359/841 |
| 5,639,054 | A | * | 6/1997 | Gerndt et al. ............ 248/478 |
| 5,722,629 | A |   | 3/1998 | Lang et al. |
| 6,130,514 | A | * | 10/2000 | Oesterholt et al. ....... 318/438 |
| 6,286,968 | B1 | * | 9/2001 | Sailer et al. ............. 359/872 |
| 6,402,330 | B1 | * | 6/2002 | Scheidegg .............. 359/879 |
| 6,598,983 | B1 |   | 7/2003 | Boddy |
| 6,814,336 | B2 |   | 11/2004 | Courbon |
| 6,877,867 | B1 | * | 4/2005 | Murakami .............. 359/841 |

(Continued)

*Primary Examiner* — Terrell McKinnon
*Assistant Examiner* — Christopher Garft
(74) *Attorney, Agent, or Firm* — Seann P. Lahey; McNair Law Firm, P.A.

(57) ABSTRACT

An adjustable support arm for a vehicle exterior rearview mirror assembly comprising a holder base adapted for mounting to the vehicle; a holder pivotally carried on the holder base; a pivot control unit included in the holder for engaging the holder base to resist rotation of the holder on the holder base; the pivot control unit including: a compression spring disposed within a retainer opening of the holder; a bushing carried on the compression spring for engaging a bearing surface in the retainer opening; and, a retainer carried in the retainer opening and coupled to the holder base to retain the compression spring and the bushing in the retainer opening, wherein the retainer is constructed and arranged to direct the bushing laterally against the bearing surface and the compression spring biases the bushing against the retainer in sliding engagement to resist rotation of the holder on the holder base.

19 Claims, 4 Drawing Sheets

U.S. PATENT DOCUMENTS

| | | | |
|---|---|---|---|
| 6,971,757 B2 * | 12/2005 | Ro | 359/879 |
| 7,165,852 B2 * | 1/2007 | Pavao et al. | 359/841 |
| 7,207,684 B2 * | 4/2007 | Huprikar et al. | 359/841 |
| 7,261,272 B2 * | 8/2007 | Courbon | 248/475.1 |
| 7,448,762 B2 * | 11/2008 | Su | 359/841 |
| 2005/0012018 A1 * | 1/2005 | Courbon | 248/479 |
| 2006/0261239 A1 * | 11/2006 | Courbon | 248/475.1 |
| 2008/0073477 A1 * | 3/2008 | Lang et al. | 248/476 |

* cited by examiner

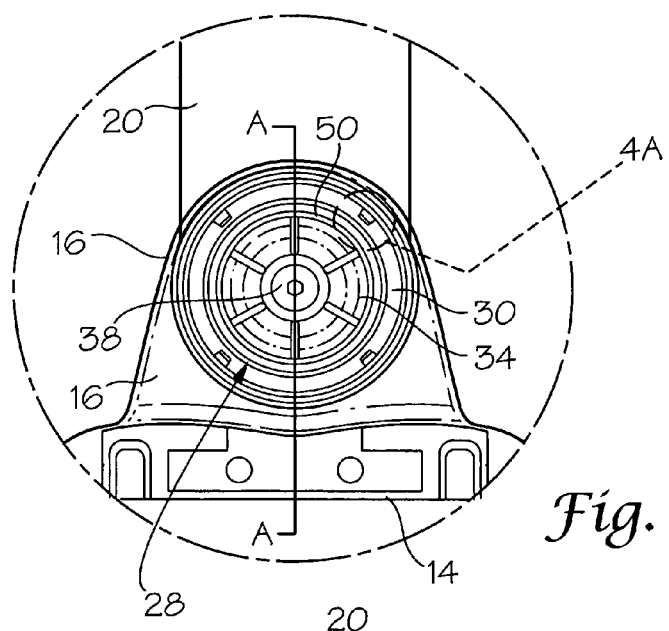
Fig. 3
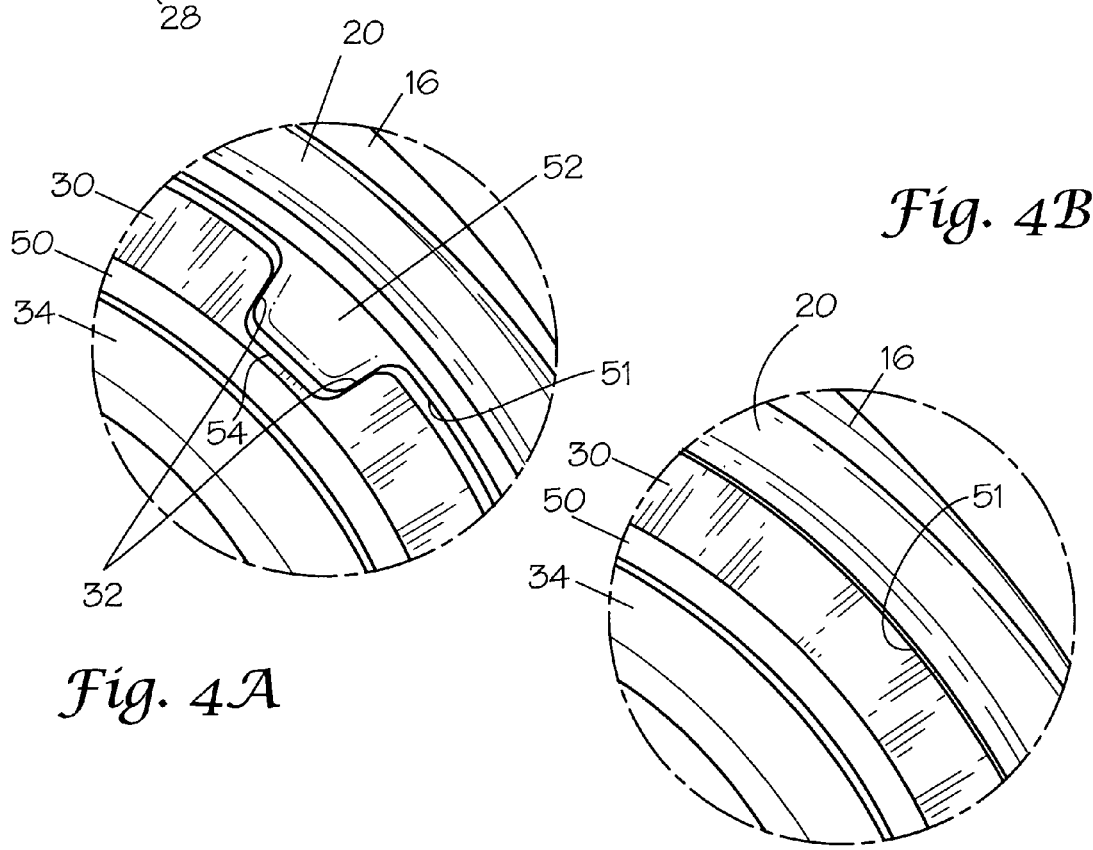
Fig. 4B
Fig. 4A

ADJUSTABLE SUPPORT ARM FOR A VEHICLE EXTERIOR REARVIEW MIRROR ASSEMBLY

CROSS REFERENCE TO RELATED APPLICATION

This application claims priority from U.S. Provisional Application Ser. No. 60/926,915, filed Apr. 30, 2007.

BACKGROUND OF THE INVENTION

1) Field of the Invention

The present invention relates generally to exterior rearview mirror assemblies for motor vehicles, and more particularly, to an adjustable support arm having a pivot control unit for resisting uncontrolled rotational movement of the support arm while allowing for infinitely variable position adjustment.

2) Description of Related Art

Rearview mirror assemblies for vehicles, particularly for commercial trucks, exist in a wide variety of shapes and sizes. These various mirror assemblies include many different arrangements for mounting the mirror assemblies on the vehicles. On large, commercial vehicles, such as trucks and buses, mirrors are often secured within mirror housings mounted on a support arm so as to extend the mirror out from the side of the vehicle thereby providing a clear view of different areas around the vehicle. Depending on the size and design of the mirror, as well as the area around the vehicle to be observed, different mounting arrangements have been used. A typical mounting arrangement includes a support arm comprised of a holder bar extending outwardly from the vehicle, often in substantially a U-shape, in which the ends of the U-shaped bar are attached to the side of the vehicle. Alternately, many mirror assemblies for commercial vehicles use a holder bar that may be attached to the vehicle at only one end, with a mirror housing being disposed at a distal opposite end or central portion, or both, of the bar. In either of these applications, mounting bars are typically attached to each side of the driver's cab of a truck, and the mirror housing is attached to the support arm in various ways.

Swivel joints are also now being included in the support arm assembly to make it possible to pivot the mirror to position the mirror at a preferred viewing position, or from an operational position in which the mirror is normally set that is essentially perpendicular to the side of the vehicle, into a storage position wherein the mirror stands essentially parallel to the side of the vehicle. This arrangement makes it possible to fold the mirror into the side of the vehicle during transport and parking decreasing its overall width or to fold the mirror back against the side in order to avoid, or at least diminish damage to the mirror upon collision with an obstacle. The swivel joints are typically designed using detent joints to hold the mirror in one of a few pre-defined operational or storage positions, highly limiting the ability to adjust the position of the mirror for viewing. While providing some flexibility to position the mirror, such swivel joints do not offer a wide range of positions for positioning the mirror assembly. Additionally, the detent systems known in the prior art suffer from significant wear and tear issues that loosen the detent resistance to secure the mirror assembly in the desired position, eventually leading to a shaky and unusable mirror assembly.

Most conventional mounting arrangements, including swivel joint arrangements, suffer from complicated constructions requiring, for instance, adapters, multiple piece connectors, multiple support braces, and a variety of screws, bolts and the like to attach the support arm to the vehicle. Such complicated mounting arrangements are more cumbersome, costly and labor intensive than may be desired. Perhaps more importantly, however, is the fact that many of these assemblies which utilize a multiplicity of connectors are subject to vibration resistance problems that result in loosening of the connections between the various mounting components of the mirror assembly, which leads to mirror shaking and visual impairment.

As noted above, a substantial problem with external vehicle rearview mirrors, particularly in the case of commercial vehicles, is the occurrence of vibration. First, vibration can negatively affect the use of the mirror, and second, vibration of the mirror can lead to damage due to fatigue for nearly every component in the mirror assembly. Over time, wear caused by wind and road vibrations loosens the connections between the various support members which mount the mirror assembly to the vehicle. In many cases, after only minimal wear has occurred on most large mirror assemblies for commercial vehicles, excessive mirror shaking is present in the assembly that significantly reduces effective use of the mirror. The support arms are particularly susceptible to wind and road vibrations due to the heavy loads of supporting the entire mirror assembly, often leading to premature failure and replacement of support member components if not properly installed on the vehicle.

Accordingly, it is an object of the present invention to provide a support arm for a mirror assembly that is infinitely adjustable in position.

It is a further object of the present invention to provide a support arm for a mirror assembly that resists loosening of the assembly components that control pivotal movement of the support arm to prevent unwanted shaking of the mirror assembly.

SUMMARY OF THE INVENTION

The above objectives are accomplished according to the present invention by providing an adjustable support arm for a vehicle exterior rearview mirror assembly, the support arm comprising a holder base adapted for attaching to the vehicle; a base key shaft fixed to the holder base; a holder pivotally carried on the holder base, and wherein the base key shaft extends into a retainer opening of the holder; a bushing carried in the retainer opening engaging a bearing surface of the retainer opening for controlling pivotal movement of the holder; a retainer carried in the retainer opening having a keyway receiving the base key shaft to resist rotation of the retainer about the base key shaft, and wherein the retainer is coupled to the base key shaft to retain the bushing in the retainer opening; a tapered retainer flange extending laterally from the retainer and cooperating with the bushing in sliding engagement to direct the bushing against the bearing surface; and, a compression spring carried in the retainer opening biasing the bushing against the tapered retainer flange so that the bushing is coupled into sliding engagement with the tapered retainer flange and directed laterally against the bearing surface to resist rotation of the holder about the retainer and base key shaft on the holder base.

In a further embodiment, the bushing including at least a first bearing segment and a second bearing segment of generally symmetrical shape which extend laterally apart to engage the bearing surface.

In a further embodiment, the bushing includes a conical bushing flange complementary to the tapered retainer flange for engaging the tapered retainer flange in a uniform engagement.

In a further embodiment, an upper conical pivot washer is carried between the tapered retainer flange and the conical bushing flange which is complementary in shape to the tapered retainer flange and the conical bushing flange for controlling frictional resistance of the sliding engagement between the tapered retainer flange and bushing.

In a further embodiment, the bearing surface comprises a holder key protruding from an inner wall surface of the retainer opening, and wherein a bushing keyway is included in the bushing receiving the holder key to resist sliding of the bushing on the inner wall surface.

In a further embodiment, the holder key and the bushing keyway include complementary tapered engaging surfaces so that wear between the bearing surface and the bushing directs the holder key into further engagement with the bushing keyway to resist sliding of the bushing on the bearing surface.

In a further embodiment, the bushing includes an annular spring recess receiving the compression spring so that the bias from the compression spring is evenly distributed across the bushing.

In a further embodiment, the retainer opening includes a lower tapered pivot surface, and the holder base includes a tapered collar disposed around base key shaft having a complementary taper to the lower tapered pivot surface for controlling lateral movement of the holder on the holder base.

In a further embodiment, a lower conical pivot washer is disposed between the tapered collar and the lower tapered pivot surface which is complementary in shape to the tapered collar and the lower tapered pivot surface for controlling frictional resistance of sliding engagement between the tapered collar and the lower tapered pivot surface.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 shows a top plan view of the adjustable support arm according to the present invention;

FIG. 4A shows a detailed section view of a portion of the adjustable support arm as designated in FIG. 3 according to the present invention;

FIG. 4B shows an alternative embodiment of the detailed section view in FIG. 4A according to the present invention; and, FIG. 5 shows a cross-section view of the adjustable support arm according to the present invention for section A-A of FIG. 3.

DETAILED DESCRIPTION OF A PREFERRED EMBODIMENT

Figure 1:
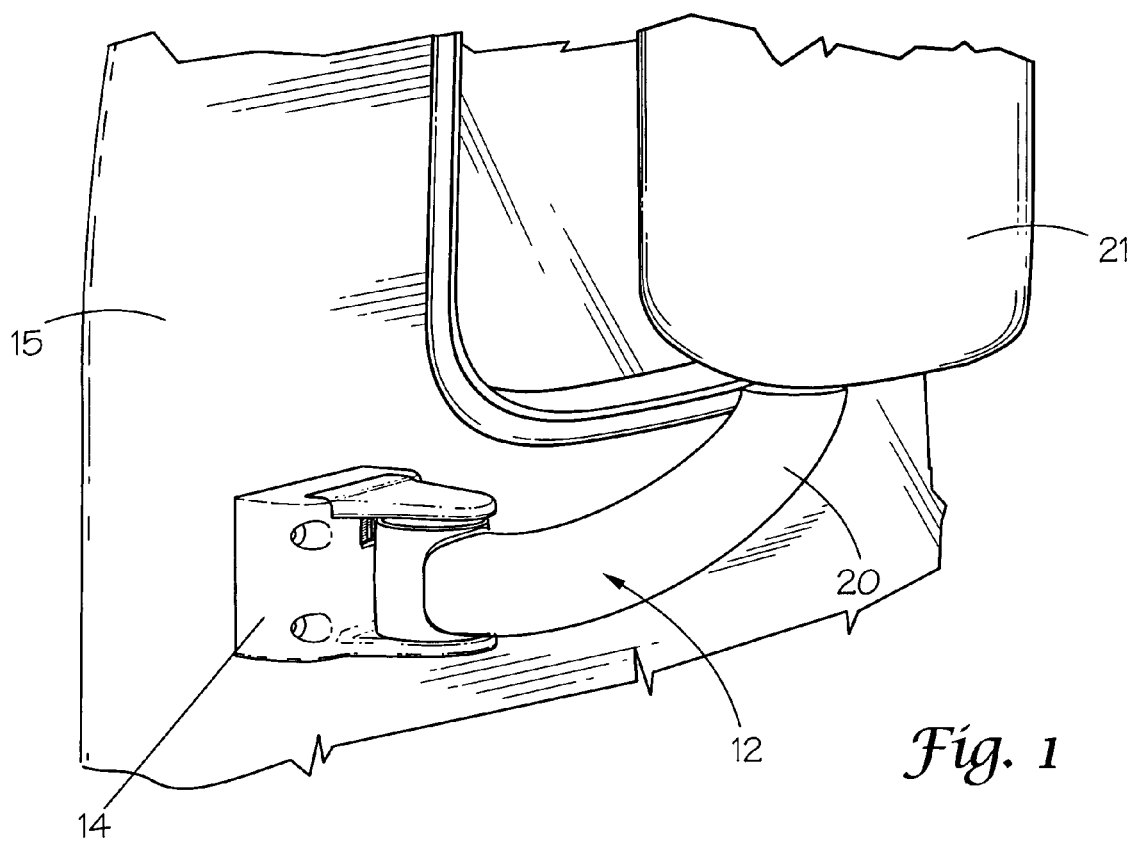
FIG. 1 shows a perspective view of the adjustable support arm according to the present invention.

With reference to the drawings, the invention will now be described in more detail. Referring to FIG. 1, an adjustable support arm, designated generally as 12, is shown for a vehicle exterior rearview mirror assembly. As set forth herein below, adjustable support arm 12 includes a pivot control unit 28 (FIG. 2) which allows for variable positioning of a holder 20, which carries mirror head 21. Additionally, pivot control unit 28 is constructed and arranged to account for wear and tear between various friction fit components to maintain a minimum pivot resistance on the holder to prevent shaking and unwanted pivoting of holder 20.

Figure 2:
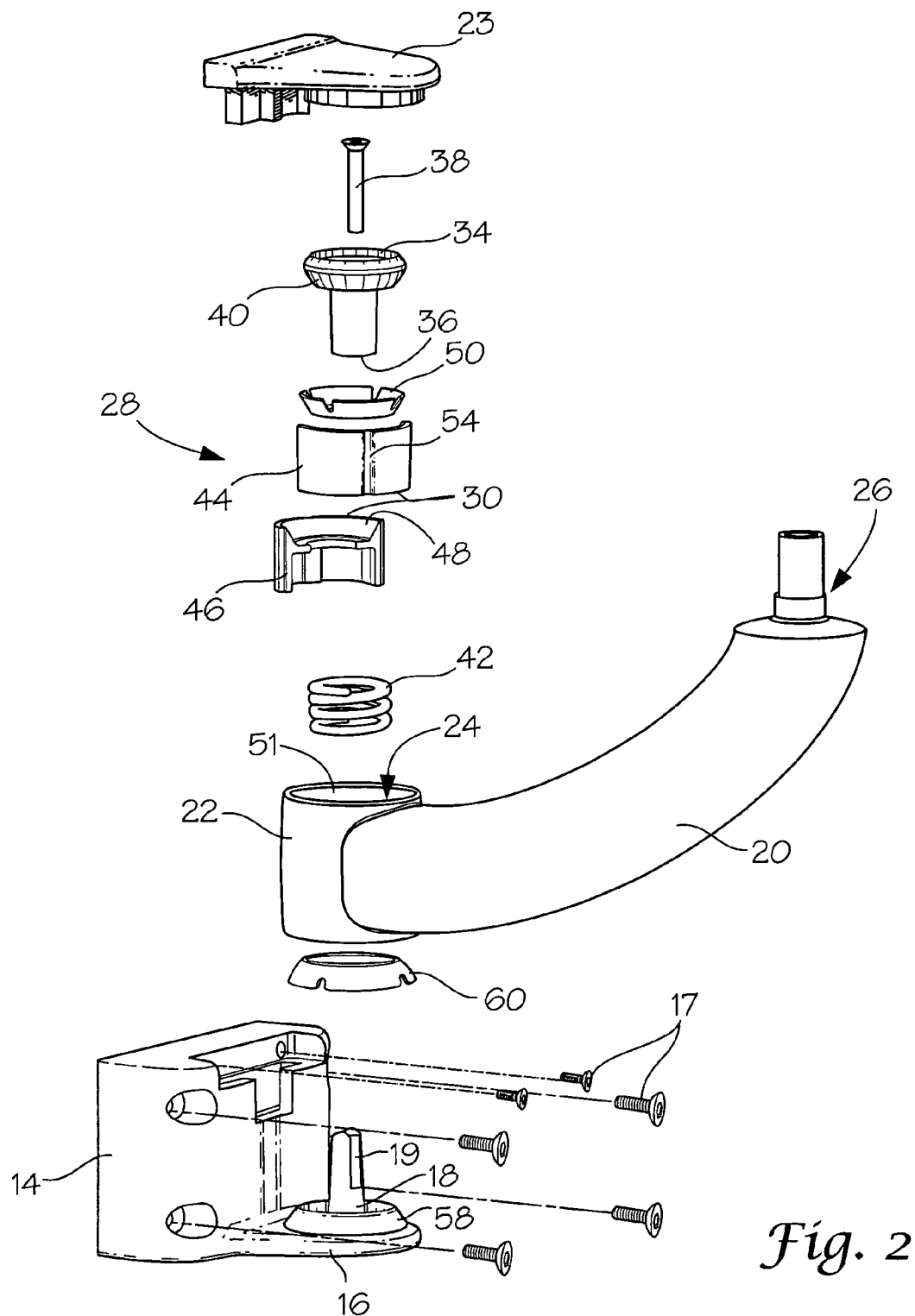
FIG. 2 shows an exploded view of the adjustable support arm according to the present invention.

Referring to FIGS. 1 and 2, adjustable support arm 12 includes a holder base 14 adapted for attaching to vehicle exterior 15. Holder base 14 is preferably bolted to vehicle exterior 15 using attachment members 17 so that there is no play between vehicle exterior 15 and holder base 14. Other well-known attachment methods to those skilled in the art may alternatively be used alone or in combination with the illustrated attachment members 17 to eliminate play between holder base 14 and vehicle exterior 15. Holder base 14 may include a laterally extending support plate 16 that carries a base key shaft 18. Base key shaft 18 is fixed to holder base 14 so that there is no rotation of base key shaft 18 on support plate 16. Base key shaft 18 also extends in a generally vertical arrangement from laterally extending support plate 16 and includes at least one keyed side 19.

Figure 5:
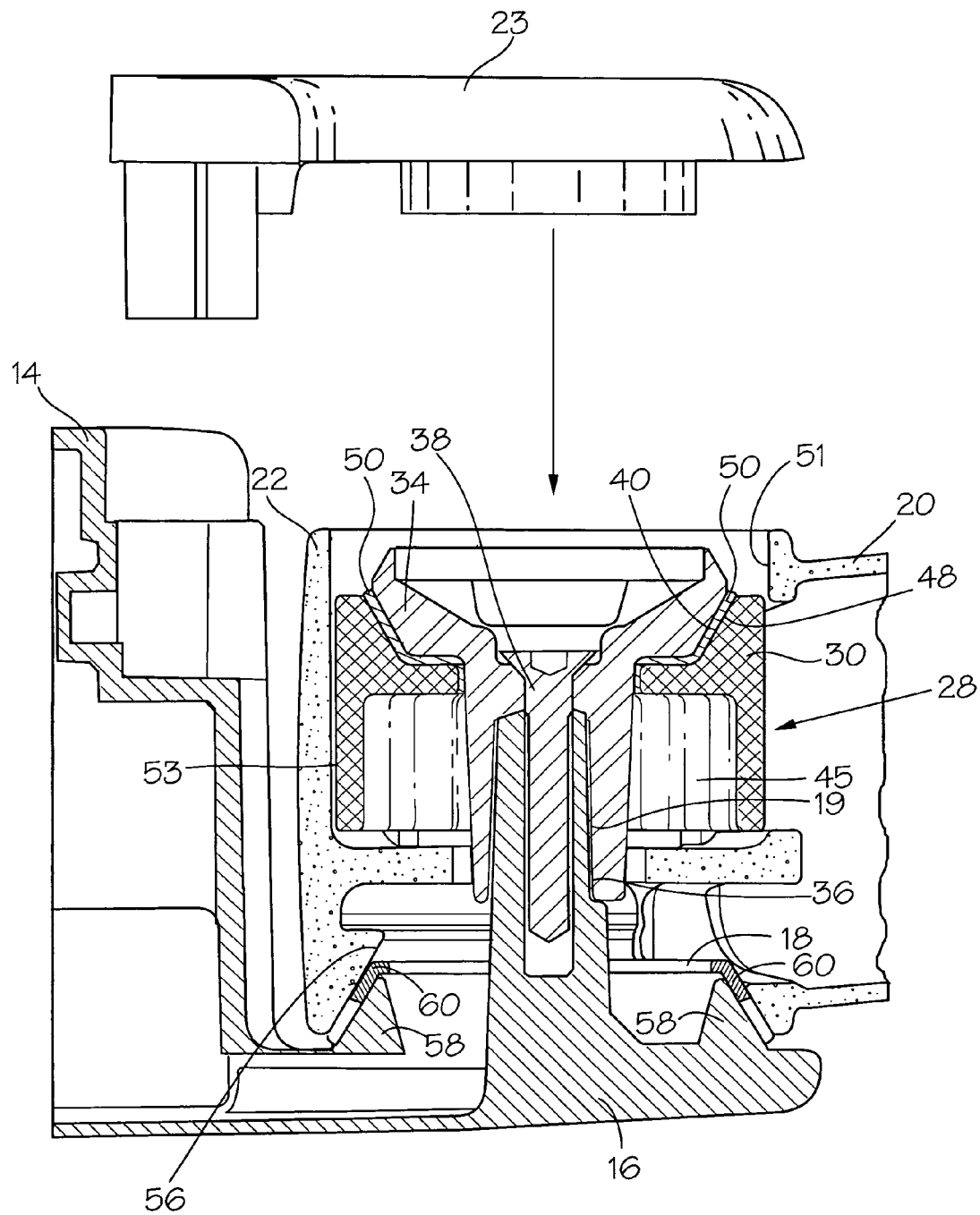

Holder 20 for supporting mirror head 21 is pivotally carried on holder base 14. Holder 20 includes a first distal end portion, designated generally as 22, forming a hollow barrel opening, hereinafter referred to as retainer opening 24, and a second distal end portion, designated generally as 26, which may be adapted for mounting mirror head 21. Referring to FIGS. 2 and 5, base key shaft 18 extends into retainer opening 24 of holder 20 for engaging components to retain holder 20 in a pivoting arrangement on holder base 14. A cover 23 may be provided to protect the pivot control components carried in retainer opening 24 as detailed herein below.

Referring to FIGS. 2 and 5, a pivot control unit, designated generally as 28, is included in holder 20 for engaging holder base 14 to resist rotation of holder 20 on holder base 14. Pivot control unit 28 includes a bushing, designated generally as 30 carried in retainer opening 24 which engages a bearing surface 32 (FIGS. 4A and 4B) of retainer opening 24 for controlling pivotal movement of holder 20. A retainer 34 is carried in retainer opening 24 having a keyway 36 for receiving base key shaft 18. Key 19 of base key shaft 18 cooperates with keyway 36 of retainer 34 to resist rotation of retainer 34 about base key shaft 18. Retainer 34 is coupled in a fixed arrangement to base key shaft 18 by a securing member 38, which may be a screw or the like. When retainer 34 is coupled to base key shaft 18, retainer 34 maintains bushing 30 in retainer opening 24 to engage bearing surface 32. A tapered retainer flange 40 extends laterally from retainer 34 and cooperates with bushing 30 in sliding engagement so that bushing 30 is directed against bearing surface 32. A compression spring 42 is carried in retainer opening 24 that bias bushing 30 against tapered retainer flange 40 so that bushing 30 is coupled into sliding engagement with tapered retainer flange 40 and directed laterally against bearing surface 32 to resist rotation of holder 20 about retainer 34 and base key shaft 18 on holder base 14. Thus, even if wear occurs between bushing 30 and tapered retainer flange 40, the force of compression spring 42 in combination with the tapered engaging surfaces maintains a constant bias of bushing 30 against retainer 34 to prevent unwanted shaking and movement of holder 20. Manual pivotal movement of holder 20 causes rotation of bushing 30 around retainer 34. Holder 20 does not rotate around bushing 30.

Referring to FIG. 2, bushing 30 may include at least a first bearing segment 44 and a second bearing segment 46 of generally symmetrical shape. This allows bushing 30 to expand and extend laterally apart when engaging tapered retainer flange 40 to engage bearing surface 32 in a friction fit arrangement to prevent sliding between bushing 30 and bearing surface 32 of holder 20. In a preferred embodiment, bushing 30 includes an annular spring recess 45 receiving compression spring 42 so that the bias from compression spring 42 is evenly distributed across the underside of bushing 30 and allows for a more compact arrangement of the components in pivot control unit 28. Bushing 30 preferably includes a conical bushing flange 48 complementary to tapered retainer flange 40 for engaging the tapered retainer flange in a uniform engagement and helping direct each of bearing segments 44 and 46 against bearing surface 32.

With continued reference to FIGS. 2 and 5, in a preferred embodiment, an upper conical pivot washer 50 is carried between tapered retainer flange 40 and conical bushing flange 48 which is complementary in shape to the tapered retainer flange and the conical bushing flange for controlling frictional resistance of the sliding engagement between tapered retainer flange 40 and bushing 30. Additionally, because the components of adjustable support arm 12 are typically made from aluminum due to its light weight, strength and durability, when they wear together the oxidation on the aluminum has a tendency to "weld" pieces together and substantially inhibit the desired pivotal movement of holder 20. To prevent this, upper conical pivot washer 50 is preferably made of plastic to resist binding between retainer 34 and bushing 30. Further, by varying the type and thickness of the plastic, or even selecting another comparable material, for upper conical pivot washer 50 it is possible to control the frictional resistance between bushing 30 and retainer 34 as is desired for a particular mirror assembly or application. Also, bushing 30 is preferably made of a durable plastic to resist binding as with upper conical pivot washer 50.

Referring to FIGS. 3 and 4A, in a preferred embodiment, to resist sliding of bushing 30 along an inner wall surface 51 of retainer opening 24 of holder 20, a bearing surface 32 is provided between bushing 30 and inner wall surface 51 comprising a holder key 52 that protrudes from inner wall surface 51 of retainer opening 24. Holder key 52 is received in a corresponding and complementary bushing keyway 54 included on the exterior side of bushing 30. In the preferred embodiment, holder key 52 and bushing keyway 54 include complementary tapered engaging surfaces so that wear between the bearing surfaces 32 of holder key 52 and bushing keyway 54 directs the holder key into further engagement with the bushing keyway to resist sliding of the bushing on inner wall surface 51. In this embodiment, sliding between bushing 30 and inner wall surface 51 is highly resisted so long as compression spring 42 maintains a biasing force to direct bushing keyway 54 against holder key 52. Further, to allow for gradual wear between holder key 52 and bushing keyway 54, a gap 53 is provided between bushing 30 and inner wall surface 51 so that as the components wear a sufficient biasing force will be maintained by allowing bushing 30 to continually expand laterally against holder key 52.

Referring to FIG. 4B, in an alternative embodiment, holder key 52 and bushing keyway 54 may be removed so that bearing surface 32 is provided by inner wall surface 51. In this arrangement, bushing 30 uniformly engages bearing surface 32 in a circumferential arrangement in retainer opening 24. Sliding between bushing 30 and bearing surface 32 is generally prevented by the biasing force provided by compression spring 42.

Referring to FIGS. 2 and 5, retainer opening 24 includes a lower tapered pivot surface 56, and holder base 14 includes a tapered collar 58 disposed around base key shaft 18. Tapered collar 58 has a complementary taper to lower tapered pivot surface 56 which cooperate to resist and control lateral movement of holder 20 on holder base 14. In a preferred embodiment, a lower conical pivot washer 60 is disposed between tapered collar 58 and lower tapered pivot surface 56 which is complementary in shape to the tapered collar and the lower tapered pivot surface for controlling frictional resistance between sliding engagement of the tapered collar and the lower tapered pivot surface. Preferably, lower conical pivot washer 60 is made of plastic or similar material to prevent binding between lower tapered pivot surface 56 and tapered collar 58 when aluminum components are used.

While a preferred embodiment of the invention has been described using specific terms, such description is for illustrative purposes only, and it is to be understood that changes and variations may be made without departing from the spirit or scope of the following claims.

What is claimed is:

1. An adjustable support arm for a vehicle exterior rearview mirror assembly, said support arm comprising:
    a holder base adapted for attaching to the vehicle;
    a base key shaft fixed to said holder base;
    a holder pivotally carried on said holder base, and wherein said base key shaft extends into a retainer opening of said holder;
    a bushing carried in said retainer opening engaging a bearing surface of said retainer opening for controlling pivotal movement of said holder, wherein said bearing surface comprises a holder key protruding from an inner wall surface of said retainer opening, and wherein a bushing keyway is included in said bushing receiving said holder key to resist sliding of said bushing on said inner wall surface;
    a retainer carried in said retainer opening having a keyway receiving said base key shaft to resist rotation of said retainer about said base key shaft, and wherein said retainer is coupled to said base key shaft to retain said bushing in said retainer opening;
    a tapered retainer flange extending laterally from said retainer and cooperating with said bushing in sliding engagement to direct said bushing against said bearing surface; and,
    a compression spring carried in said retainer opening biasing said bushing against said tapered retainer flange so that said bushing is coupled into sliding engagement with said tapered retainer flange and directed laterally against said bearing surface to resist rotation of said holder about said retainer and base key shaft on said holder base.

2. The support arm of claim 1 wherein said bushing including at least a first bearing segment and a second bearing segment of generally symmetrical shape which extend laterally apart to engage said bearing surface.

3. The support arm of claim 1 wherein said bushing includes a conical bushing flange complementary to said tapered retainer flange for engaging said tapered retainer flange in a uniform engagement.

4. The support arm of claim 3 including an upper conical pivot washer carried between said tapered retainer flange and said conical bushing flange which is complementary in shape to said tapered retainer flange and said conical bushing flange for controlling frictional resistance of said sliding engagement between said tapered retainer flange and said bushing.

5. The support arm of claim 1 wherein said holder key and said bushing keyway include complementary tapered engaging surfaces so that wear between said bearing surface and said bushing directs said holder key into further engagement with said bushing keyway to resist sliding of said bushing on said bearing surface.

6. The support arm of claim 1 wherein said bushing includes an annular spring recess receiving said compression spring so that the bias from said compression spring is evenly distributed across said bushing.

7. The support arm of claim 1 wherein said retainer opening includes a lower tapered pivot surface, and said holder base includes a tapered collar disposed around base key shaft having a complementary taper to said lower tapered pivot surface for controlling lateral movement of said holder on said holder base.

8. The support arm of claim 7 including a lower conical pivot washer disposed between said tapered collar and said lower tapered pivot surface which is complementary in shape to said tapered collar and said lower tapered pivot surface for controlling frictional resistance between sliding engagement of said tapered collar and said lower tapered pivot surface.

9. An adjustable support arm for a vehicle exterior rearview mirror assembly, said support arm comprising:
   a holder base adapted for mounting to the vehicle;
   a holder pivotally carried on said holder base;
   a pivot control unit included in said holder for engaging said holder base to resist rotation of said holder on said holder base; said pivot control unit including:
      a compression spring disposed within a retainer opening of said holder;
      a bushing carried on said compression spring for engaging a bearing surface in said retainer opening, wherein said bearing surface comprises a holder key protruding from an inner wall surface of said retainer opening, and wherein a bushing keyway is included in said bushing receiving said holder key to resist sliding of said bushing on said inner wall surface; and,
      a retainer carried in said retainer opening and coupled to said holder base to retain said compression spring and said bushing in said retainer opening, wherein said retainer is constructed and arranged to direct said bushing laterally against said bearing surface and said compression spring biases said bushing against said retainer in sliding engagement to resist rotation of said holder on said holder base.

10. The support arm of claim 9 including a tapered retainer flange carried by said retainer engaging said bushing for directing said bushing laterally against said bearing surface.

11. The support arm of claim 10 wherein said bushing includes a conical bushing flange complementary to said tapered retainer flange for engaging said tapered retainer flange in a uniform engagement.

12. The support arm of claim 11 including an upper conical pivot washer carried between said tapered retainer flange and said conical bushing flange which is complementary in shape to said tapered retainer flange and said conical bushing flange for controlling frictional resistance of said sliding engagement between said tapered retainer flange and bushing.

13. The support arm of claim 9 wherein said bushing includes at least a first bearing segment and a second bearing segment of generally symmetrical shape which extend laterally apart to engage said bearing surface.

14. The support arm of claim 9 wherein said retainer opening includes a lower tapered pivot surface, and said holder base includes a tapered collar disposed around base key shaft having a complementary taper to said lower tapered pivot surface for controlling lateral movement of said holder on said holder base.

15. The support arm of claim 14 including a lower conical pivot washer disposed between said tapered collar and said lower tapered pivot surface which is complementary in shape to said tapered collar and said lower tapered pivot surface for controlling frictional resistance between sliding engagement of said tapered collar and said lower tapered pivot surface.

16. A pivot control unit for a vehicle exterior rearview mirror assembly, said pivot control unit comprising:
   a compression spring disposed within a retainer opening of a holder;
   a bushing carried on said compression spring for engaging a bearing surface in said retainer opening, wherein said bearing surface comprises a holder key protruding from an inner wall surface of said retainer opening, and wherein a bushing keyway is included in said bushing receiving said holder key to resist sliding of said bushing on said inner wall surface; and,
   a retainer carried in said retainer opening and coupled to a holder base to retain said compression spring and said bushing in said retainer opening, wherein said retainer is constructed and arranged to direct said bushing laterally against said bearing surface and said compression spring biases said bushing against said retainer in sliding engagement to resist rotation of said holder on said holder base.

17. The pivot control unit of claim 16 wherein said bushing includes at least a first bearing segment and a second bearing segment of generally symmetrical shape which extend laterally apart to engage said bearing surface.

18. The support arm of claim 17 including a tapered retainer flange carried by said retainer engaging said bushing for directing said first and second bearing segments laterally against said bearing surface.

19. The support arm of claim 18 wherein said first and second bearing segments each include a conical bushing flange complementary to said tapered retainer flange for engaging said tapered retainer flange in a uniform engagement.

\* \* \* \* \*